March 5, 1940.   D. L. KIMBALL   2,192,679
DISPLAY APPARATUS
Filed Oct. 1, 1938    3 Sheets—Sheet 1

Inventor
Don L. Kimball
By Strauch & Hoffman
Attorneys

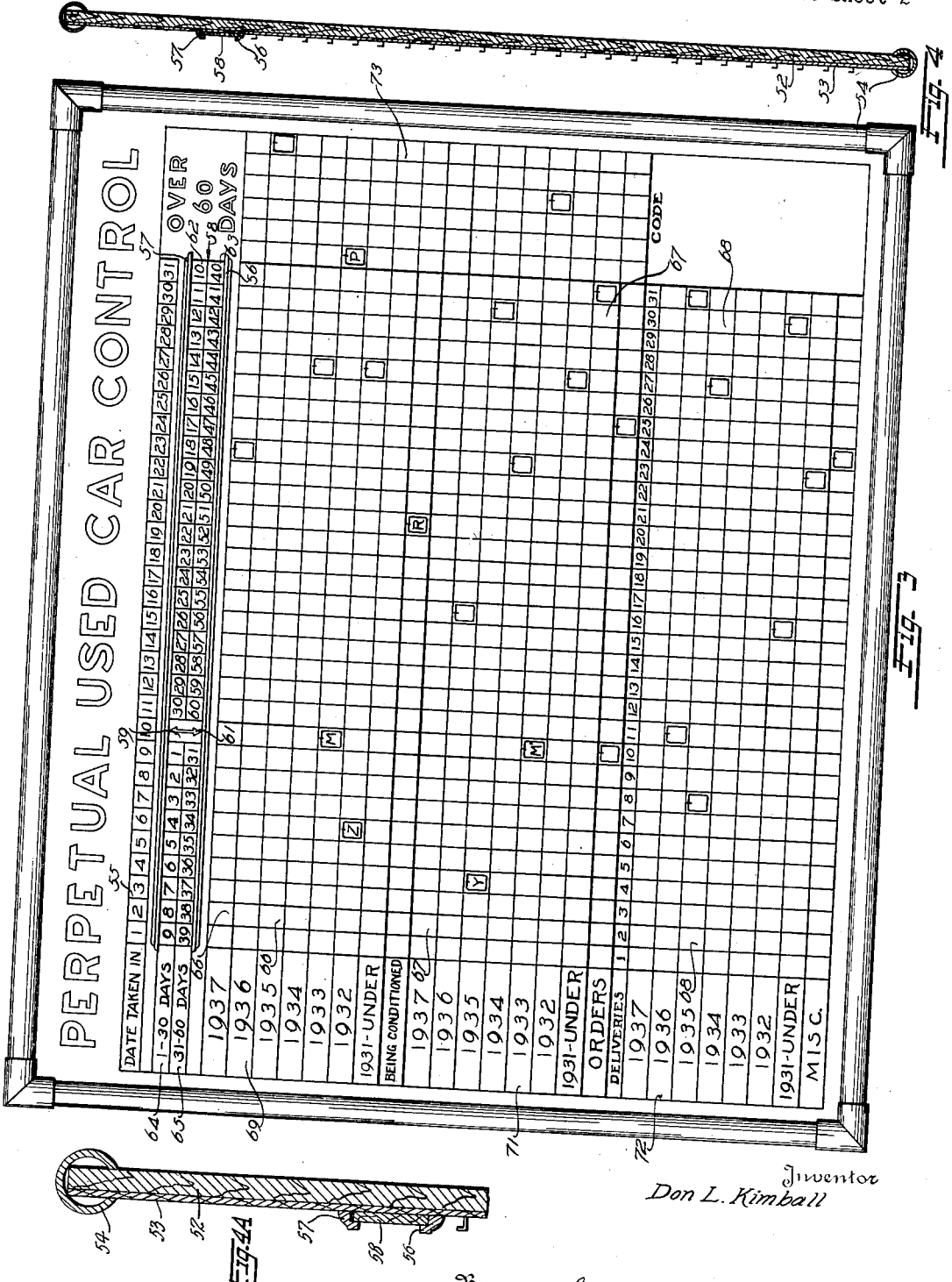

March 5, 1940.
D. L. KIMBALL
2,192,679
DISPLAY APPARATUS
Filed Oct. 1, 1938
3 Sheets-Sheet 3
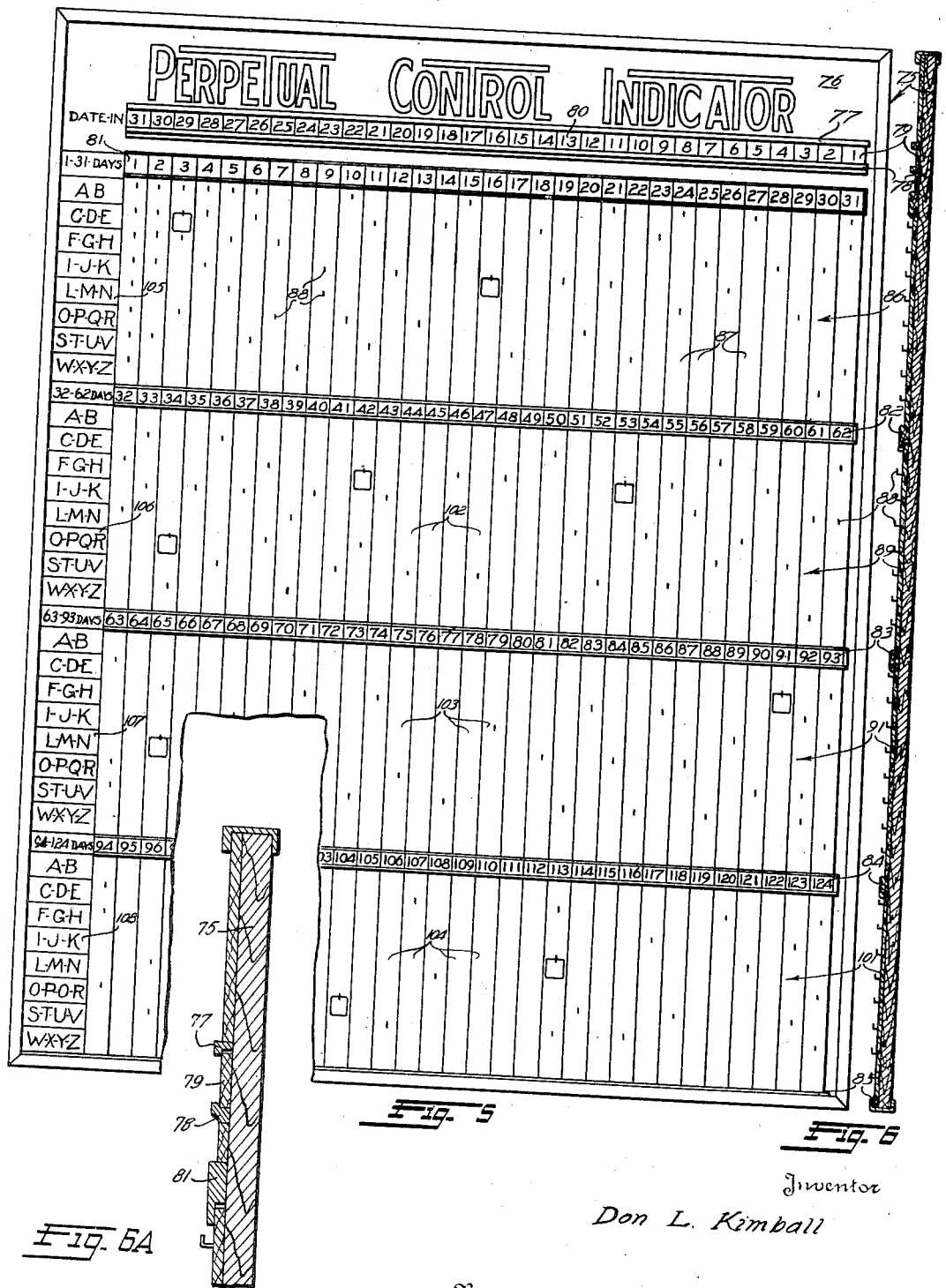
Inventor
Don L. Kimball
By Strauch & Hoffman
Attorneys Patented Mar. 5, 1940

2,192,679

UNITED STATES PATENT OFFICE 2,192,679

DISPLAY APPARATUS

Don L. Kimball, Chicago, Ill.

Application October 1, 1938, Serial No. 232,886

13 Claims. (Cl. 40—19.5)

The present invention relates to display apparatus and more particularly to display boards upon which data representing business conditions or the like are arranged for visual survey and periodic checking.

The present invention has a particularly wide field of use in that its principles are easily applicable to any business or field of operation wherein periodic up to date surveys have to be made. A few of its general applications are in the fields of sales control, prospect control, service control, budget and finance control, parts inventory and accounts receivable.

In general the invention is basically concerned with segregating data relating to a particular field of operation into groups which are periodically reformed to maintain a constant running check on the field of operation with respect to periodically advancing reference dates. Each group ordinarily represents a time period, such as a month or a year, which has elapsed since a predetermined reference date and slide rule apparatus is provided for periodically correlating the reformed fields and the advancing reference dates as time passes.

The operation of the invention is flexible and practically perpetual in character in that all dates and time periods are relative, and the desired information contained in the data groups is kept constantly before the business executive who is using the board.

The slide rule operation of the invention insures that each data element of each data group, which contains data relating to a unit time such as a day, spends a predetermined time in a particular data group or field on the display board and then moves on to the next field after predetermined intervals. The number of fields, as well as the length of each time period and the character of its designation, is purely a matter of choice in practicing the invention.

The invention is particularly adapted for use in conducting businesses and operations wherein it is important to know at all times the general state of the business or operation and where frequent periodic checks of such conditions as sales, stock inventory or the like are desired, as for planning future expansion and determining trade tendencies.

Application of the invention to various phases of the automobile business will be described herein as illustrative of preferred embodiments of the invention although it will be understood that the invention may be applied to other operations or businesses in any suitable field.

In the automobile service business it is important to know the regularity with which customers return for such periodic work as lubrication and the like. This serves as a check on the quality of work done in the past and provides a basis for computing future business conditions such as expansion, new products and the like.

Again, in the used car business, the number of cars in stock is a measure of liability, and frequent inventory should be made to determine what factors promote speedy turnover. It is important to know what cars sell easily and how many slow selling cars in stock are tying up money which should be moving in the business.

Accordingly it is a major object of the present invention to provide a novel method and apparatus for compactly and clearly displaying data representing general business or operating conditions as a whole and for positively indicating and calling attention to various phases of the business or operation as they come up for periodic consideration.

It is a further object of the invention to provide a novel display apparatus having a plurality of display fields and a substantially continuous movable indicator system cooperatively identified with those fields. Specifically cooperating corresponding color areas are preferably provided on both the indicator and the display fields.

A further object of the invention is to provide a display board apparatus having a novel multi-section indicator mechanism.

Still a further object of the invention is to provide a display apparatus having a plurality of display fields wherein novel data carrying panels in the separate fields are removably mounted and are capable of being exchangeably mounted in the separate fields. Specifically the display fields are preferably identified by contrasting color areas which correspond to like color areas on a movable indicator device in the apparatus.

Further objects of the invention will presently appear as the description of the invention proceeds in connection with the appended claims and the annexed drawings in which:

Figure 3 is a front elevation of a used car inventory board embodying the invention.

Figure 4 is a side elevation in section illustrating further the board of Figure 3.

Figure 4A is an enlarged sectional view of the upper portion of the board of Figure 4.

Figure 5 is a front elevation of a display board illustrating another embodiment of the invention.

Figure 6 is a side elevation in section of the board of Figure 5.

Figure 6A is an enlarged sectional view of the upper portion of the board of Figure 6.

*Customer follow-up board*

Figures 1, 2, 2A:
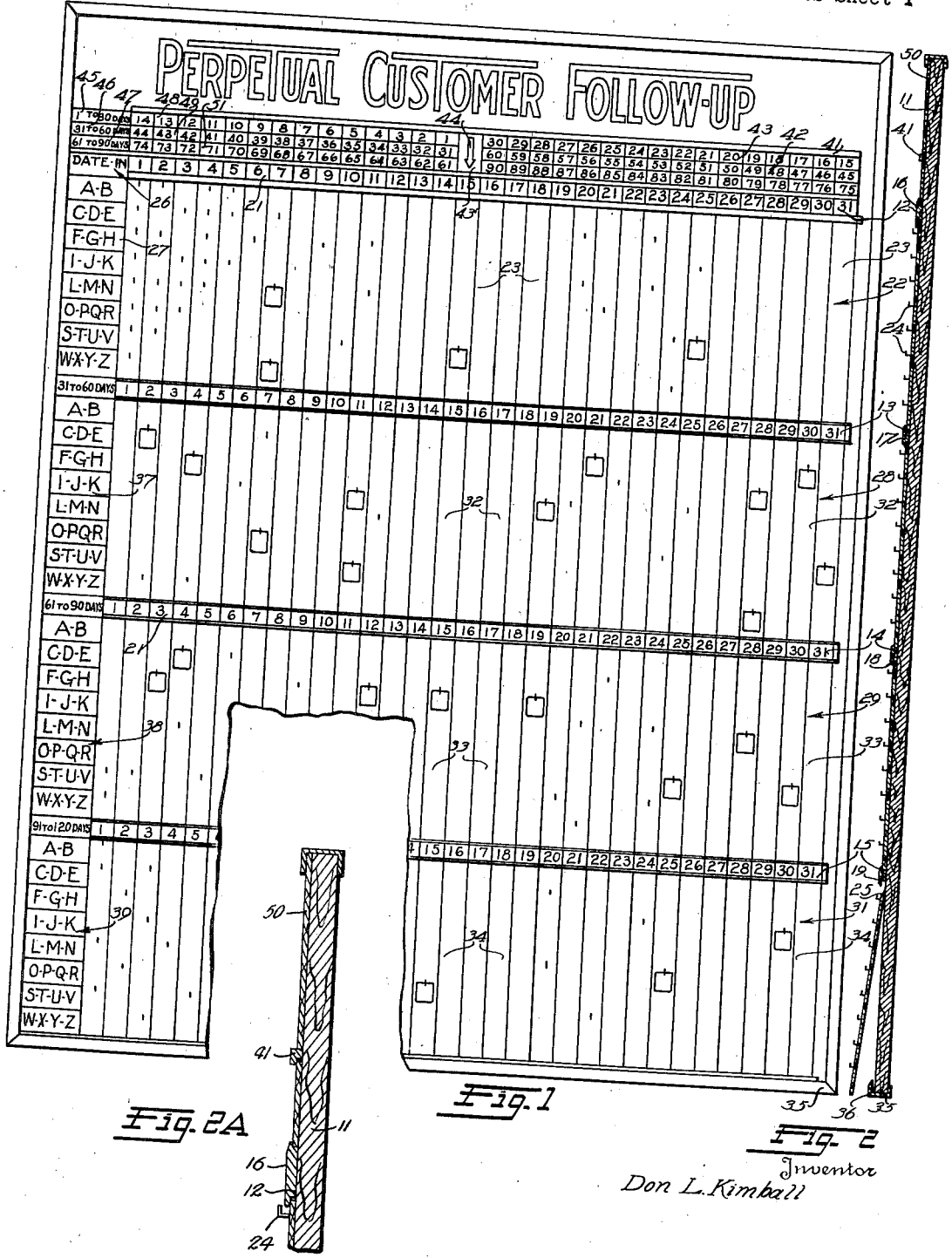
Figure 1 is a front elevation of a customer follow-up board embodying the present invention.
Figure 2 is a side elevation in section of the board of Figure 1.
Figure 2A is an enlarged sectional view of the upper portion of the board of Figure 2.

In this embodiment of the invention, a support or frame 11, which is preferably a flat board of wood, plyboard, fibre composition or any suitable rigid material, is provided with a plurality of vertically spaced, laterally extending molding strips 12, 13, 14 and 15 which are substantially of the same length and are spaced equidistantly. These molding strips are secured rigidly upon the front surface of board 11 in any suitable manner.

Strips 12–15, inclusive, are formed with enlarged front head portions 16–19, respectively which extend the whole length of the strips and project vertically above and below the strips a slight distance to cooperate with the front surface of wall 11 for forming panel receiving pockets as will be described.

Since the board here described is to be designed for thirty-day periods of check-up, the front surfaces of each of heads 16–19 are divided and ruled into 31 equal spaces 21 in which are printed the numerals 1–31 in order from left to right in Figure 1. These spaces 21 are all aligned vertically and each row of spaces 21 will be designated hereinafter as date lines.

Strips 12 and 13 serve as supports for a sectional field 22 which comprises a series of 31 sections or panels 23 each provided with a single vertical row of tag holding hooks 24. Each panel 23 is provided with a beveled top edge at 25 so that it may be mounted upon the board by first inserting the beveled edge 25 upwardly and forwardly into the socket at the lower side of strip 12, then swinging the lower edge of the panel toward board 11 until it is flush therewith and then releasing the slat to allow it to settle by gravity until its lower edge is seated in the upper socket at strip 13.

Preferably the upper socket at strip 13 is shallower than the lower socket at strip 12 and the parts are otherwise dimensioned so that after the lower edge of panel 23 has been seated in supporting contact with strip 13, it is held substantially flush against the front surface of board 11 by head portions 16 and 17. In this manner each panel 23 is quickly and easily removably mounted upon the front surface of board 11. Hooks 24 may serve as handles for inserting and removing panels 23.

As illustrated in Figure 1, each panel 23 is preferably of the same width and cooperates with a single space 21, being of the same width as space 21 and vertically aligned therewith. The sectional field 22 is thus made up of 31 similar, separately removable panels disposed side by side.

Field 22 and strips 12 and 13 terminate a substantial distance from the left side of the board to provide a space 26 which has a vertical dimension substantially equal to the distance between strips 12 and 13 and which is ruled off into a plurality of vertically spaced horizontal rows 27. Rows 27 correspond in number to the hooks 24 on each panel 23 and are horizontally aligned therewith so that each horizontal row of hooks along field 22 is aligned with a row 27 of space 26.

Rows 27, as shown in Figure 1, are marked to designate the letters of the alphabet in order, those letters being grouped in any convenient manner to conserve space. The letters represent surnames of customers. For example, those customers whose names begin with either A or B would be listed in the top row along field 22.

Sectional fields 28, 29 and 31, made up of a plurality of panels 32, 33 and 34, respectively, arranged side by side, are mounted upon the board below field 22. Each of these fields is preferably identical with field 22, with the various panels being interchangeable between the different fields.

The whole board 11 is preferably bounded by a metal rim 35 of channel shaped cross section which reenforces the board and provides a pleasing appearance. Along the bottom edge of the board, rim 35 cooperates with a spacer strip 36 to provide a lower socket for the slats of the sectional panel.

To the left of each of fields 28, 29 and 31 is provided a ruled customer name index space substantially identical with space 26 above described. These spaces are designated at 37, 38 and 39 respectively.

Directly above field 22, strip 12 and a suitable guide rail 41 cooperate to provide a slide guide for a movable, sectional date indicator slide designated generally at 42. Slide 42 comprises a series of 31 separate block units 43, each of which is preferably aligned with a space 21 and of the same width as that space.

One block 43' serves as an index marker and is provided with a pointer 44 for indicating a date in the date line represented by spaces 21 on head 16.

At the left of indicator slide 42, the surface of the board is ruled to provide three horizontal rows 45, 46 and 47 in which are printed the legends 1–30 days, 31–60 days and 61–90 days, respectively. Slide 42 is also ruled off into three horizontal rows 48, 49 and 51 aligned with the rows on the board. The numerals 1–30, 31–60 and 61–90 are marked consecutively but in inverse order upon these latter rows, respectively. The block containing pointer 44 is not marked numerically and is located before the block containing the numerals 30, 60, 90 and after the block containing the numerals 1, 31, 61.

In order to designate cooperating portions of the board, colored sections are preferably employed. For example row 45, row 48, space 26 and the front surface of head 16 are all preferably colored in a single color such as blue. Similarly rows 46 and 49, space 37 and the front surface of head 17 are colored in a single color such as yellow; and rows 47 and 51, space 38 and the front surface of head 18 are colored in a single color such as red.

Spaces 27, 37 and 38 are also preferably marked 1–30 days, 31–60 days and 61–90 days respectively to insure proper identification. The region bounding lower field 34, comprising space 39 and the front surface of head 19, is also preferably colored in a single color different from any of the others above used, such as green. This region has no cooperating row on indicator 42 but obviously such could be added if desired.

Above guide 41, the board is provided with a title header strip 50 which preferably bears the name of the operation carried out by the board.

In operation a separate tag is prepared for each customer and on each tag is marked all the data pertinent to that customer and his vehicle. These tags are preferably differently colored according to the alphabetical classification of the customers. For example, customers whose names begin with A or B might have white tags. This would result in a row of white tags across the top of each panel.

Each customer's tag is set up upon the board in its proper place under the date line according to the date appearing on his last service order with the block containing pointer 44 having its initial setting above the date upon which the board is assembled. Thus the tags in field 22 will represent all of those customers who have been serviced within the last 30 days and the tags in fields 28, 29 and 31 will represent those customers who have been serviced in the periods representing 31-60, 61-90 and 91-120 days ago.

It is apparent therefore that only a single glance at the board is necessary to gain an accurate picture of the entire customer sales business. This is especially valuable where future business plans are being prepared.

In addition to this business summary, the board is designed to call attention daily to customer groups who have not returned for service within 30, 60 or 90 days after their last service. Each day the slide 42 is moved one space to the right in Figure 1 to indicate a new date on the date line upon head 16. The block 43 which emerges from the guide at the right is reinserted at the extreme left of slide 42.

Suppose that the present date is the fifteenth of the month. The pointer 44 will be positioned above the numeral 15 on the date line as shown in Figure 1.

This indicates that thirty days have elapsed since all of the customers whose tags hang on the panel 23 directly below that numeral 15 have had their last service. Similarly 60, 90 and 120 days have elapsed since the customers whose tags hang on panels 32, 33 and 34 respectively directly below the date numeral 15 have had their last service.

In this manner all of the customers who are to be contacted at the present date are clearly indicated and suitable reminder cards, letters and other contact mediums may be speedily prepared by the clerical force.

After the various reminder cards have been sent out, panel 34 below date 15 is removed and the customer tags stripped therefrom. Then removable panels 33, 32 and 23 under date numeral 15, with their tags intact, are shifted downwardly on the board to fields 31, 29 and 28 respectively immediately below so that they will come up for further attention after thirty days more have elapsed. The clean panel 34 is inserted in field 22 in the space under the date numeral 14 for receiving freshly prepared tags listing work done the previous day.

As stated above, each day the index slide 42 is shifted one date space to the right to indicate that vertical row of panels which is to be taken into consideration that day and the above described cycle is repeated each day.

The various numerals in rows 48, 49 and 51 on the slide are available to tell exactly how many days have elapsed since a particular customer has had his last service. For example, suppose a customer's tag is at the present date, the fifteenth, hung in field 29 on that panel which is directly beneath the stationary date line numeral 28. It is noted that this is the red 61-90 day field and now referring to that numeral in the red 61-90 day row on slide 42 which is located above the date line numeral 28, it is found that 78 days have elapsed since that customer has been serviced.

The above described system provides for a series of periodic checks upon customers who have been delinquent in having their cars serviced and eliminates waste motion in preparing customer follow-up material.

It has been found that this constant periodic contact with customers is beneficial both to the dealer and the customer in insuring constant employment for the former and in avoiding major car defects which might arise from careless neglect of necessary periodic services.

Although the above board has been described for periodic checks of 30 day intervals up to a total of 120 days, it will be understood that the principle of the invention is applicable to checks of any desired time intervals for any desired periods of time.

*Used car inventory board*

In this embodiment of the invention, illustrated in Figures 3 and 4, a rigid frame or support 52 is provided with a facing sheet 53 of plywood or some similar material presenting a smooth surface at the front of the support.

A boundary rim 54 of metal, preferably generally circular in cross section, extends along the edges of support 52 and aids in clamping sheet 53 to the support. Rim 54 reenforces the whole board and in addition presents a pleasing appearance so that the board fits in with modern office furnishings.

Near the top of the front surface of the board a narrow area 55, extending horizontally of the board, is divided along its length into 31 equal spaces which are numbered 1-31 consecutively. Area 55 is the date line on the board and is labeled "Date taken in."

Below the date line a pair of horizontal guide rails 56 and 57 provide a slide guide for a multi-section date indicator slide 58. Slide 58 is made up of a series of 31 individual contiguous blocks 59 each disposed below a date space of row 55.

Slide 58 is ruled off into two horizontal rows 62 and 63 which are aligned with label spaces 64 and 65 on the front surface of the board. In these label spaces the upper row is designated "1-30 days" while the lower row is designated "31-60 days". Row 62 and label space 64 preferably are colored green while row 63 and label space 65 are colored yellow for a purpose later to be described.

Rows 62 and 63 are marked, with one numeral to each block, from 1-30 and from 31-60, respectively, but reading inversely with the higher numerals at the left as illustrated in Figure 3. One block contains no numerals and bears an index pointer 61. This block is disposed between the blocks numbered 1, 31 and 30, 60, respectively.

Slide 58 is moved only from left to right in Figure 3. The blocks 59 which drop out at the right side of the slide guide are replaced at the left side in order that the slide may be kept continually in operation.

Below slide 58, the major portion of the board surface is ruled off into a grid, the spaces of which are divided into a number of display fields designated at 66, 67 and 68, respectively, and preferably colored green, yellow and blue respectively.

Each field has 31 rows of vertical spaces all aligned with the date row spaces. The various vertical spaces in each row are provided for classification of the cars in stock, such as by yearly models or code numbers, and index spaces 69, 71 and 72 are provided at the left of fields 66, 67 and 67 respectively for listing the desired classifications.

To the right of fields 66 and 67, a portion of the grid is colored red and represents a display field 73 labeled "Over 60 days". Below field 73 is a space providing a "Code" field. Upon this field are legends and explanations of the various colors and forms of the tags used in the display fields.

Each of the grid spaces on the board is provided with a hook upon which data tags are hung. A separate tag is made out for each car as it is taken into stock and that tag is hung in proper place in field 66 under the date taken in. The index 61 is advanced from left to right one date space every day and calls attention to the fact that the tags in the vertical rows directly below pointer 61 are up for special consideration on that day.

The board presents a check upon the exact length of time each car represented by a tag on the board has been in stock. For example, referring to the tag Z in field 66, it is noted that this car was taken in on the sixth of the month and is a 1932 model. The other data as to style, condition, price, etc., will be found marked on the tag. For ascertaining just how long the car has been in stock it is noted that field 66 is colored green. By noting that space in the green 1–30 day indicator row which lies directly above the tag Z it is found that the car has been in stock for four days. The present date is, of course, the tenth, being indicated by the pointer 61 at the date line 55.

The horizontal row at the lower part of field 66 which is labeled "Being conditioned" indicates those cars which have been acquired, as by trade-in, and are being prepared for sale. This row is included in the green field 66 since it hardly ever takes more than 30 days to repair a car.

In this manner a check may be maintained upon the repair department. For example tag R represents a car which was taken in on the 20th of the month preceding and has been in the repair shop for 21 days. When repairs have been finished, tag R is placed in its proper place in the display fields.

Tag M represents a 1933 model car which has been in stock for 30 days and has therefore completed its period in the 1–30 day field. All of the tags in that row of field 66 which lies below the pointer 61 are moved downward to the corresponding row in field 67, the new position of tag M being indicated by the tag M'. This procedure is followed every day as the pointer 61 advances one space.

Field 67 is the 31–60 day field. At the present date, the tenth as indicated by pointer 61, tag Y represents a 1935 model car which was taken in on the fourth day of a previous month and has been in stock for 36 days.

When indicator 61 points out those tags in field 67 which have completed their 60 days in stock, these tags are removed to the 60 day red field 73 where they remain until the car has been disposed of in some manner. Tag P represents a car which has been in stock more than 60 days.

Below field 67 is a horizontal row of grid spaces labeled "Orders". When a sale of a particular car reaches the order stage, its tag is removed from the display field above and placed in the order row. Cooperation of this row and the movable indicator tells just how long the car has been in this stage. Such a check upon orders eliminates the possibility of a car being held out of the sales field too long on a small deposit or awaiting decision by an uncertain customer. When orders are not completed within a reasonable time, the tags are returned to the colored display fields above and the cars go back to stock.

When an order has been completed and a car has been delivered, the corresponding tag is removed from the display field or order row and placed in its proper position under the actual date of delivery in the blue "Delivered" field 68. This field is cleared at the end of each current month and a monthly check of the stock on hand may be obtained by balancing these deliveries against stock taken in that month.

The above described board enables an executive or office manager to ascertain, from his position in the office, the exact state of his used car business. The board indicates the exact age of every car in stock and gives a good check on the efficiency of the repair and service departments by reference to the "Being conditioned" group of tags.

A further check on the efficiency of the salesmen is afforded by reference to the "Orders" group of tags and complete information as to the current month deliveries is obtained by reference to field 68.

Operation of the board requires only a few minutes each day, the time required to shift the indicator slide one date spaced and move the expired tags to the next 30 day period display field. The color scheme for cooperating the indicator slide with the corresponding display fields may be likened to a traffic light. For example the group of cars represented in the red fields are dangerous to the investment involved and should be sold as promptly as possible.

*Modified follow-up board*

Figures 5 and 6 illustrate a modified form of follow up board construction in which groups of data are arranged in fields which are preferably daily adjustable to provide up to date periodically displayed information.

Referring to Figure 5, board 75 is provided at the top of its front surface with a title space 76 below which a pair of horizontal guide rails 77 and 78 form an open ended slide guideway for receiving and retaining an indicator slide 79.

Slide 79 is made up of a series of 31 separate blocks 80 which are numbered from 1 to 31 in inverse order as shown in Figure 5. Slide 79 is labeled "Date in".

Below slide 79 a horizontally extending guide bar 81, which is generally L-shaped in cross section as shown in Figure 6, is secured to the front surface of the board. A plurality of horizontal guide rails 82, 83, 84 substantially T-shaped in cross section are secured to the board below rail 81 and a bottom guide rail 85, substantially L-shaped in cross section, extends along the board adjacent the bottom edge thereof.

Guide rails 81, 82, 83, 84 and 85 form open ended guideways for slidably receiving a plurality of data display fields as will be later described.

The front face of rail 81 is divided into 31 equal spaces which are numbered from 1 to 31 and are vertically aligned with the indicia blocks 80, each space being disposed below a separate indicia block. Similarly the front faces of rails 82, 83, 84 and 85 are each divided into 31 equal spaces which are aligned vertically with the spaces on rail 81 and are numbered 32-62 days, 63-93 days and 94-124 days respectively.

A display field 86 made up of a series of 31 display panels 87 is mounted between rails 81 and 82. Each panel 87 is of the same width as each block 80 and carries a vertical column of tag holders 88 which may be of any suitable form for carrying data cards, tags or the like. Panels 87 are horizontally slidable for a purpose to be later described.

Similarly, display fields 89, 91 and 101, each of which is made up of a series of 31 slidably mounted panels 102, 103 and 104 respectively, are arranged on the guide rails below field 86.

Panels 87, 102, 103 and 104 are preferably of identical size and shape so that they may be interchangeable between the various fields.

At the left side of the display fields, the surface of the board is divided into four ruled index spaces 105, 106, 107 and 108 which are similar to spaces 26, 37, 38 and 39 of the board illustrated in Figure 1. Index spaces 105, 106, 107 and 108 are preferably colored blue, yellow, red and gun metal respectively for identification purposes and for designating different phases of the field of operation under control.

In operation, with the data, tags or cards in proper place on holders 88, each day the display fields are each moved one panel space to the right in Figure 5. The panel 87, which was pushed out of the guide at the right side of field 86, is inserted at the left side of field 89 directly below the space numbered 32 with its data cards or tags intact. This means that all of the data on this shifted panel 87 has been on the board for more than the 31 day period embraced by field 86 and is now entering a new phase in the field of operation.

Similarly the panel 102, which was pushed out of field 89, is inserted at the left side of field 91 directly under numeral 63 and panel 103, which was pushed out of field 91, is inserted at the left side of field 101 directly below the numeral 94.

The panel 104 which was pushed out of field 101 contains data which has spent 124 days on the board which is the useful display life in this operation and, therefore, need no longer be displayed. Hence, the tags or cards are stripped from that panel 104 and it is inserted at the extreme left side of field 86 ready to be loaded with the data corresponding to the present reference day.

The data on the cards or tags on holders 88 may represent any desired type of information. For example, each tage may represent a customer who has made a particular type of purchase. The day after the customer makes the purchase a tag containing data relative to the purchase is made out and hung on the board on the fresh panel under the space marked 1 in field 86. Since this panel is advanced one space to the right each day, the number in the space directly above the panel indicates the exact number of days that have elapsed since that customer has made a purchase of this nature.

As the panel travels from field to field its progress may be easily followed. Suppose all customers are to be billed at the end of 31 days. It is necessary only to make out bills for those customers whose tags are hung on the panel which is pushed out of field 86 each day. No further check up would be necessary to determine what bills should be sent out that day. Reminders could be sent at the end of each 62, 93 and 124 day period by the same token.

The indicator slide 78 is moved to the right one space each day and thus affords a quick check upon the exact date upon which the customer made his last purchase. In the set up of Figure 5, the tag $a$ contains data which has been on the board for 13 days and was placed on the board on the 19th of the previous month the day after the customer made the purchase. The tag $b$ has been on the board 45 days and was placed on the board on the 18th day of the month before last since it is in the 32-62 day field.

*Advantages of the invention*

The present invention enables a business executive or the like to keep a constant, accurate picture of the whole field of operation near at hand at all times and no complicated manipulations or interpretations of the control board are necessary to keep the same in operation. Only one simple daily or other desired periodic adjustment need be made and the board is set for the day or period.

The operation of the board can be attended to by any member of the clerical force and no especial training for the same is required.

The innumerable uses to which the invention may be put, become readily apparent as soon as the basic principles of correlated periodic data fields and reference dates are applied to the particular field of operation to be controlled or checked.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a display apparatus, a support having a plurality of display fields arranged in substantially vertical alignment thereupon, each of said fields comprising a plurality of individual panels which are movably mounted side by side on said support, a slidable indicator device disposed on said support above said fields, and a fixed indicator on said support adjacent said slidable indicator, said slidable indicator having a plurality of rows of indicia thereupon and said slidable indicator having a row of indicia arranged inversely with respect to the indicia on the fixed indicator, each row on said slidable indicator cooperating with a separate field on said support.

2. In a display apparatus, a plurality of separate display fields, a fixed indicia bearing indicator and a slidable indicator device extending therealong bearing indicia arranged in inverse relation to the indicia on said fixed indicator, said device comprising a plurality of individual indicia bearing blocks arranged side by side in predetermined order, and an open ended slide guide supporting said blocks.

3. In a display board for use in periodic checking, means defining a fixed row of date indicating indicia extending laterally of said board, a plurality of display fields aligned below said date row, each field comprising a plurality of individual shiftable panels each aligned with a date on said date row, an indicator slide on said board, said slide having an index portion cooperating with said date row and separate indicia bearing portions cooperating with the separate fields with the indicia of said fixed row and said indicator slide being arranged in inverse relation.

4. In a display board of the type defined in claim 3, each of said fields and indicia bearing portions on said slide having cooperating identifying color areas.

5. In a display apparatus or the like for displaying a current, accurate picture of a field of operation; a row of fixed indicia providing current reference time units extending over a predetermined period of time; shiftable means immediately adjacent said fixed indicia carrying a parallel row of indicia corresponding to said time units but arranged inversely with respect thereto, the indicia of each row being cooperatively aligned; and a record field adjacent said indicia containing means for supporting data in predetermined relation to each of said rows of indicia so that, when said row of inversely arranged indicia is shifted to cooperate with a new time unit indicium at the end of each elapsed time unit, said data is automatically correlated to the new time unit.

6. In a display apparatus or the like; a fixed row of time unit indicating numerals arranged in continuous order; slidable means bearing a row of numerals corresponding to said time units but arranged in inverse order; and a display field having a plurality of data spaces adjacent said indicia, the indicia of each row being cooperatively aligned with said data spaces and each other.

7. In an operation checking apparatus; a fixed row of time unit indicating numerals arranged in continuous order; means carrying a row of numerals corresponding to said time units but arranged in inverse order movably supported adjacent said fixed row and adapted to be shifted substantially parallel thereto; and record holding means having a plurality of record mounting spaces adjacent said indicia, the indicia of each row being cooperatively aligned with said record mounting spaces and each other.

8. Apparatus of the type described comprising a support; a fixed row of time unit indicating numerals arranged in continuous order on said support; slidable means on said support bearing a row of numerals corresponding to said time units but arranged in inverse order; and a record holding field on said support having a plurality of record holding spaces adjacent said indicia, the indicia of each row being cooperatively aligned with said record holding spaces and each other.

9. In a display apparatus or the like for displaying a current, accurate picture of a field of operation; a row of fixed indicia providing current reference time units extending over a predetermined period of time; guide means adjacent said indicia; a plurality of individual elements slidably mounted on said guide means, said elements bearing indicia corresponding to said fixed indicia but arranged in inverse order with respect thereto and each of said elements being aligned with a separate time unit indicium; a display field adjacent said indicia having means for supporting groups of data in predetermined relation to each of said rows of indicia so that, when said elements are shifted to cooperate with a new time unit indicium at the end of each elapsed time unit, said data is automatically correlated to the new time unit.

10. In a display apparatus or the like; a horizontal row of fixed time indicating numerals arranged in order; means slidably supporting a parallel row of elements adjacent said time numerals, said elements bearing similar time indicating numerals arranged inversely with respect to said first row; and a display field having a plurality of data spaces, each of said data spaces being vertically aligned with aligned time indicating numerals on said rows.

11. In a record display apparatus or the like; a substantially horizontal row of fixed time indicating numerals arranged in order; indicia bearing means supported adjacent said time numerals for movement in a path substantially parallel to said fixed row, said means bearing similar time indicating numerals arranged inversely with respect to said first row; and a record field having a plurality of record holding spaces, each of said record holding spaces being vertically aligned with aligned time indicating numerals on said rows.

12. Operation checking apparatus of the type described comprising means for supporting a row of current time indicating indicia and an adjacent row of cooperating indicia arranged in inverse relation thereto, one of said rows being fixed and the other movable along the fixed row and substantially parallel thereto; said movable row comprising a series of separate, contiguous elements each bearing an indicium in alignment with an indicium on said fixed row; and record holding means aligned with said indicium.

13. Display apparatus comprising a display field; a fixed row of current date indicating numerals; a slide guide extending adjacent said row; a plurality of contiguous indicia bearing elements slidable along said guide, said indicia being aligned with said numerals and cooperating therewith; and one of said elements bearing an index for correlating said slidable indicia to said display field and a selected current date, the remaining slidable elements bearing indicia arranged inversely to said date numerals.

DON L. KIMBALL.